Feb. 28, 1928.
E. A. ROBINSON
AUTOMATIC TRAIN PIPE CONNECTER
Filed Feb. 3, 1920
1,660,766
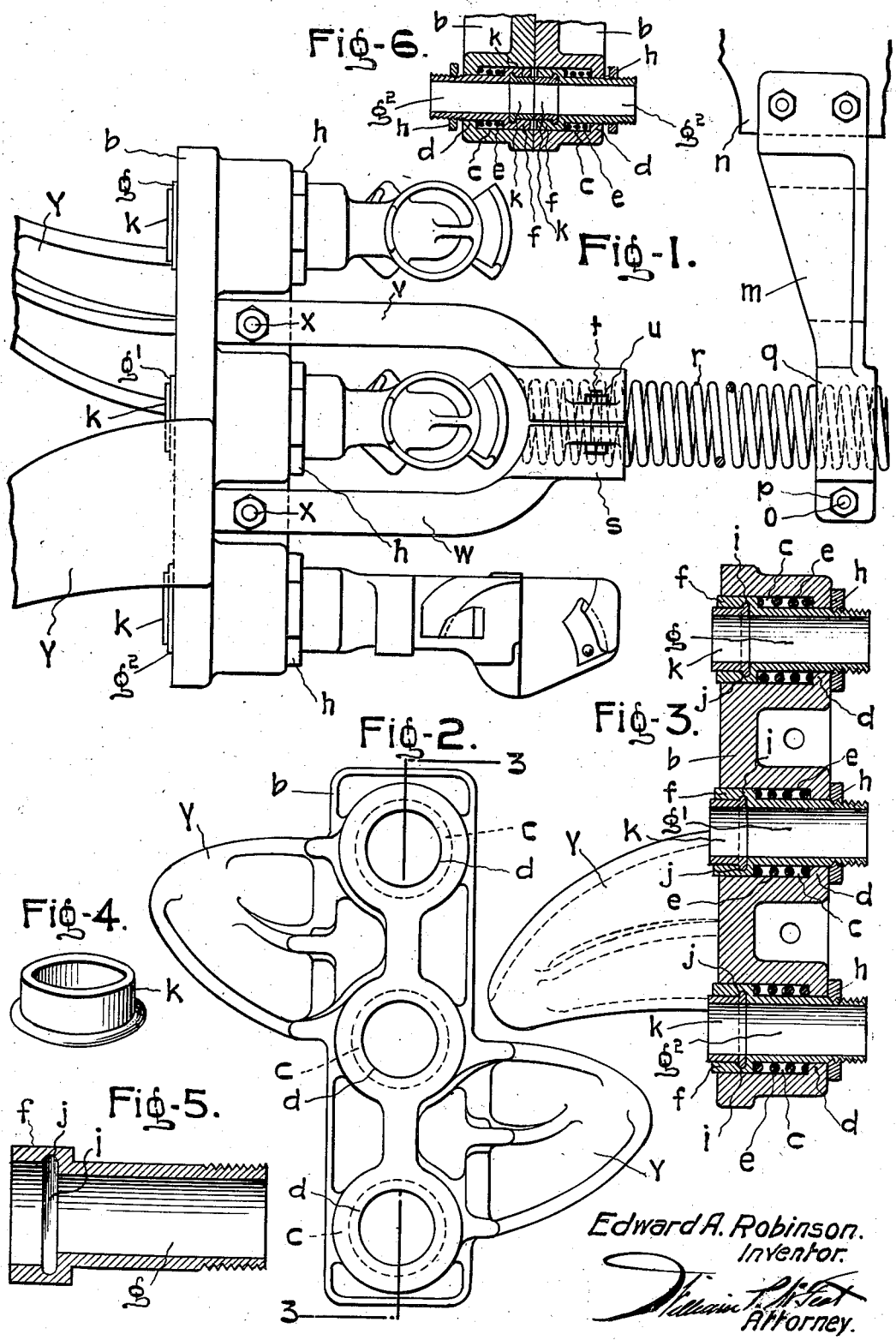
Edward A. Robinson.
Inventor.
William F. McFart
Attorney.

Patented Feb. 28, 1928.

1,660,766

UNITED STATES PATENT OFFICE.

EDWARD A. ROBINSON, OF MONTREAL, QUEBEC, CANADA, ASSIGNOR TO HIMSELF AND ELLISON EDWARD WORKMAN, OF MONTREAL, CANADA.

AUTOMATIC TRAIN-PIPE CONNECTER.

Application filed February 3, 1920. Serial No. 355,948.

Heretofore it has been impossible to prevent leakage in automatic train pipe connecters after they have been a short time in use and particularly in cold weather when the gaskets by which the tightening of the joints between the connecters of coupled cars is secured become congealed and remain in a compressed state and cannot subsequently make contact with corresponding gaskets of other connecter heads; another defect is that the comparatively extensive bearing faces between coupled connecter heads as heretofore constructed require accurate machining and when worn out must be replaced by new head or heads with remachined faces.

The destruction of the heads themselves through wear is not the sole source of loss of these parts with existing constructions, since wear of the couplings alters the meeting plane of the connecters to an extent for which no previous adequate adjustment has been provided; with the result that the entire mechanism must be thrown aside. Attempt to tilt the supporting bracket has proved unsatisfactory as an adjustment at best because of the alteration of angle at which the head is presented and position of the head and because the adjustment secured is insufficient for the purpose.

This defect seriously affects even new constructions since there is no provision in the connecters nor in use for the adjustment necessary to accommodate a connecter-head equipment when initially set in place, to the vertical plane in which it engages its companion connecter head when the car couplers are locked, I have discovered other defects to cure which in addition to those just mentioned is the object of my invention.

One of my main purposes is to offer a major adjustment of the distance between the supporting bracket and the head, of great advantage in itself, in connection with a lesser range of adjustment of the individual gasket positions with respect to the face of the head so that a wide range of movement may be secured with a nicety of adjustment otherwise difficult of attainment and with complete control over the position of each gasket.

A further purpose is to use a spring as a means of supporting a head from the bracket and thread the spring into one or preferably both of its terminals, clamping it to vary the active length of spring between the head and bracket for adjustment, using the spring as a buffer spring and as a universal joint.

To this end my invention consists of a coupler head containing a bushing presenting one or more ducts carrying the gasket at one end while the opposite end is adapted to have a hose connection of one of the train pipes, air or steam, as the case may be, coupled thereto, the casting of the head and the bushing or duct being constructed and arranged to accommodate and protect a spring acting between them with a tendency to keep the bushing and the gasket carried thereby projected beyond the face of the casting and the gasket beyond the face of the bushing or duct. In order to afford a support for the head from the car coupler or other relatively fixed part and a support independent of the bushing or duct, I secure the connector head to a bracket on the car coupler by an adjustable yielding device, the bracket being of particular construction to accommodate this adjustable yielding connection. My invention is applicable to heads for unitary or triple connection.

For full comprehension however of my invention reference must be had to the accompanying drawings in which similar reference characters indicate the same parts, and wherein:

Figure 1 is a side elevation of my improved connector head with hose connections coupled;

Fig. 2 is a face view of the connector head;

Fig. 3 is a front to rear sectional view taken on line 3—3 Fig. 2;

Fig. 4 is a detail perspective view of one of the gaskets;

Fig. 5 is a sectional view of the bushing or duct and illustrating in detail the structural feature for accommodating the gasket which is carried thereby; and Fig. 6 is a detail sectional view illustrating the relative positions of the bushings and gaskets of two connector heads connected together.

My improved connector head consists of a casting $b$ chambered as at $c$ in parallel directions conforming to the position to the air connections and the steam connection to which the hose leads from the train pipes. Some heads, of course have a single connection and my invention is equally applicable to this type of connector head. These chambers $c$ are circular in cross section and extend through the head from the front face to the rear face thereof, the rear end being of reduced diameter presenting an abutment constituting in the illustration an integral part of the head. Each of these chambers contains a bushing or sleeve the front end of which has a head $f$ of a diameter to slidably fit the chamber while the remainder of the sleeve is of a reduced diameter slidably fitting the collar $d$. An expansile helical spring $e$ is also contained within each chamber and encircles the bushing. This spring imparts to the bushing a tendency to maintain a position with its forward end protruding slightly beyond the outer face of the casting, the helical spring bearing between the shoulder presented by the head $f$ when the bushing is set in position and the collar $d$.

In the embodiment illustrated there are three hose connections, which for convenience are referred to herein, in their entireties, as "terminals" and whose bushings are indicated at $g$, $g^1$ and $g^2$. The setting of each bushing in position is effected by a nut $h$ screwed upon the inner end thereof which is screw-threaded for the purpose and to receive the coupling by which the hose is connected. The outer end of the bushing is inwardly chambered as at $i$ and each of these chambers has an enlargement $j$ and by means of these enlargements retains an elongated cylindrical gasket $k$ having a circumferential bead at its inner end for engagement with the enlargement $j$.

This gasket corresponds in interior diameter with the bushing $g$ and its axial measurement is slightly greater than the chamber $i$ containing it in order that its outer end may protrude beyond the end of the bushing. Each of these bushings constitutes what may be termed a movable gasket sleeve. The gasket sleeve $g$ has an air-brake hose coupled thereto, the sleeve $g^1$, the air-train pipe coupler thereto and the sleeve $g^2$ the steam hose coupled to it. The several hose connections form lock nuts for holding the parts in adjusted position so as to compress the springs to greater or less degrees of compression corresponding to less or greater gasket projections beyond the face of the head.

This connecter head is supported from the car coupler or other relatively fixed part, and independently of the gasket sleeves, by a bracket $m$ secured to the car coupler indicated at $n$ or other relatively fixed part. This bracket is split and provided with a clamping bolt $o$ and nut $p$ by which a sleeve or collar $q$ presented by the lower end of the bracket is opened or closed. The interior of this sleeve is threaded to correspond with and receive a buffer spring $r$ one end of which is adapted to be screwed through the same, the opposite end of this buffer spring being screwed in the split collar, $s$ also furnished with a clamping bolt and nut $t$ and $u$ respectively. This collar $s$ is formed integrally with a carrier, here shown as a yoke, the legs $v$ and $w$ of which are bolted as at $x$ to the casting of the connecter head between the sleeves $g$, $g^1$ and $g^2$ and straddling $g^1$, the crotch of which yoke is of sufficient depth to accommodate the air coupling by which the train air pipe is coupled to the gasket sleeve $g^1$ straddled by the yoke. The connecter head has the usual oblique horns $y$ for use in automatic coupling.

My improved connecter head is proof against leakage either of air or steam because of the fact that the gaskets are kept alive by the expansile spring acting upon the gasket carrying sleeves while the connecter head itself is kept constantly in yielding bearing relation with the connecter head which it engages by the buffer spring $r$ which is sufficiently heavy to sustain the head, and owing to its resiliency causes the engaging heads to accommodate themselves to one another and effect a perfect connection. Another structural advantage of my improved head is that the face of the casting need not be machined as it has no part in effecting the connection other than to act as a carrier for the gasket sleeves which with their gaskets are the active parts in effecting the connection.

The advantage of the screw-threaded connection between both spring and its bracket $m$ is that it may be adjusted relatively to the pulling face of the car coupler as the latter becomes worn by being screwed in either direction through the bracket thus adjusting the connecter head to its proper position with the outer face of the gasket sleeve in the transverse vertical plane in which the corresponding faces of the companion connecter head must be engaged to obtain a perfect joint. The spring also constitutes a universal connection between the bracket and head.

It will be evident that the adjustment of distance between the face of the head and the bracket may be made by adjustment of the head with respect to the spring or of the spring with respect to the bracket, as preferred, and that a half turn of adjustment only is required to bring the head to a new position corresponding for connection purposes with its preceding position and with the horns in corresponding positions.

What I claim is as follows:

1. In a train pipe connecter, a bracket adapted for connection with a fixed car member, a head, means for supporting it from the bracket, a terminal for connection to a train pipe, passing through the head, resiliently pressed forward but restricted in its projection beyond the head and an adjustment of the limit of projection of the terminal beyond the head adapted to be altered while the connection with the train pipe is unchanged, permitting retraction of the terminal toward the rear of the head whereby the extent of projection of the terminal with respect to fixed car parts is made adjustable.

2. In a train pipe connecter the combination with a head having a duct therein, a sleeve slidably mounted in the duct, a gasket carried by one end of the sleeve and protruding beyond the face of such end, means yieldingly retaining the sleeve in a position with the gasket protruding beyond the head, means for giving a fine adjustment to the sleeve relatively to the head and a support for the head from relatively fixed car parts comprising a bracket and a connection between the bracket and the head, the support containing a coarse adjustment by unit distances.

3. In a train pipe connecter, a bracket, a head, means for supporting the head from the bracket, a terminal for connection to a train pipe fitting, passing through the head and restricted in its projection beyond the head and an adjustment for the projection of the terminal adapted for operation while the train pipe is attached to the terminal.

4. In a train pipe connecter, a bracket, adapted for connection with a fixed car member, a head, means for supporting the head from the bracket, a train pipe terminal adapted to pass through the head and having an abutment thereon, a gasket carried by the terminal, an abutment rigid with the head, a spring located between the two abutments, a thread upon the terminal and a nut adjustable upon the thread, bearing against the rear of the head at one end and terminating at a point upon the thread, whereby the extent of projection of the terminal in disuse with respect to the fixed car member is made adjustable.

5. In a train pipe connecter, a bracket adapted for connection with a fixed car member, a head, means for supporting the head from the bracket, a terminal for connection to a train pipe fitting passing through the head and restricted in its projection beyond the head and an adjustment to limit the projection of the terminal, exterior to the terminal and independent of the fitting.

6. In a train pipe connecter the combination with a casting rigidly united to a fixed train part having a cylindrical chamber extending from one face to within a short distance of its opposite face, and an opening through the said opposite side of the casting concentric with and of less diameter than the chamber, thus forming an abutment; a sleeve mounted slidably in the abutment and having a head located slidably in the chamber, the end of the sleeve opposite to the head being externally screw-threaded, an expansile helical spring within the chamber encircling the sleeve and bearing between the head of the latter and the abutment, a gasket carried concentrically by the sleeve within the head thereof and protruding beyond the face of the head, and means for limiting the axial movement of the sleeve in one direction consisting of a nut screwed upon the screw-threaded end of the sleeve and lying wholly thereon.

7. A train pipe connecter consisting of a head having a duct extending therethrough from front to rear, a sleeve of greater length than the length of the duct, and closely supported by the front and rear portions of the duct wall and located therein with its ends protruding beyond the ends of the duct, a gasket mounted upon one end of the sleeve, means mounted upon the opposite end of the sleeve for adjusting the extent to which the first-mentioned end protrudes beyond the front face of the head, and a support for the head from the fixed car member whereby the extent of projection of the gasket with respect to said fixed car member in disuse is made adjustable.

8. In a train pipe connecter, a bracket adapted for connection with a fixed car member, a head, means for supporting the head from the bracket, a plurality of separate and separately adjustable train pipe terminals carried by the head and means for separately adjusting the extent of projection of the terminals in front of the head while retaining their connections with the respective train pipes unchanged whereby the extent of projection of the individual terminals with respect to the fixed car member is made adjustable.

9. In a train pipe connecter, a bracket adapted to be supported upon a fixed car part, a head, a train pipe terminal carried by the head and adapted for connection with a corresponding terminal, a support for the head from the bracket, a major adjustment affecting said support for varying the normal position between the bracket and head and a minor adjustment carried by the head for varying the extension of the terminal with respect to the head.

10. In a train pipe connecter, a bracket adapted to be supported upon a fixed car part, a head, a train pipe terminal, carried by the head and adapted for connection with a corresponding terminal, a yoke connected with the head, a clamp upon the yoke, a spring threaded within the clamp and adapted to be screwed therein to adjust the extent of spring between the bracket and head and means for supporting the spring from the bracket.

11. In a train pipe connecter, a bracket adapted to be supported upon a fixed car part, a head, a train pipe terminal, carried by the head and adapted for connection with a like terminal, a yoke upon the head, a spring connected therewith and means upon the bracket for providing threaded adjustment of the spring within the bracket and rigid fastening of the same in adjusted position to vary the extent of spring between the bracket and head.

12. In an automatic train pipe connecter, combination with a part of the rolling stock, of a bracket rigidly mounted upon said part and having a screw-threaded opening, a connecter head, a device mounted upon said head and having a screw-threaded opening in alinement with the opening in said bracket and a helical spring having its opposite ends respectively screwed through and longitudinally adjustable in the openings in the bracket and said device and constructed and arranged to yieldingly support the head from the bracket.

13. In an automatic train pipe connecter, the combination with a part of the rolling stock, of a bracket rigidly mounted upon said part and having a screw-threaded opening, a connecter head, a device mounted upon said head and having a screw-threaded opening in alignment with the opening in said bracket, a helical spring having its opposite ends respectively screwed through the openings in the bracket and said device providing for longitudinal adjustment and constructed and arranged to yieldingly support the head from the bracket, means for preventing axial movement of the spring relatively to the bracket, after adjustment and means for preventing axial movement of the spring relatively to said device after adjustment.

14. In an automatic train pipe connecter, the combination with a part of the rolling stock, of a bracket the upper end of which is rigidly fastened to said part, the lower end of said bracket terminating in a split collar internally screw-threaded, a connecter head, a yoke consisting of a split collar internally screw-threaded and having legs rigidly secured to the said head, a helical spring having its opposite ends screwed into the said collars, providing longitudinal adjustment therein and clamping bolts passed through said collars and constructed and arranged to prevent axial movement of the spring therethrough.

15. A train pipe connecter system comprising a head, a train pipe terminal carried by the head, a bracket and a connection between the bracket and head, the system having two longitudinal adjustments, one fine and capable of gradual change and the other coarse by unit distances.

16. In an automatic train pipe coupling, the combination of a coupling head having a coupling face and a plurality of chambers which extend through said head, a plurality of conduits mounted one in each of said chambers and adapted to move longitudinally therein, a plurality of gaskets mounted one in the forward end of each of said conduits for making a butt joint with a complementary gasket in a mating head, a plurality of springs seated one upon each of said conduits for resisting longitudinal movement thereof in said coupling head, said springs being confined within said chambers, a spiral supporting spring positioned at the rear of said coupling head for supporting the head and for cooperation with said first mentioned springs to place said gaskets under pressure when mating coupling heads couple up in service, said coupling head being provided with a projection comprising spaced members which extend rearwardly thereof and terminate in a portion having on its inner walls a recess or groove, a hollow base on the inner walls of which is also provided a recess or groove, and means for locking said supporting spring in its supporting relation to said coupling head and said base with one end of such supporting spring seated in the recess or groove of said portion and the other end thereof seated in the recess or groove of said base.

17. In an automatic connecter the combination of a head, a yoke extending rearward from the head, a coil spring, means to secure one portion of the spring to said yoke, and anchoring means for the spring to adapt the spring to resiliently resist movement of the head from normal position, said anchoring means including a member through which the spring may be screwed and which may be gripped upon the outside of the spring for the purpose of varying the position of the head relatively to the pulling face of the car coupler in connection with which it operates.

In testimony whereof I have signed my name.

EDWARD A. ROBINSON.